W. HODGSON.
REGULATOR.
APPLICATION FILED MAR. 26, 1917.

1,284,895.

Patented Nov. 12, 1918

Inventor
William Hodgson,
By his Attorney

UNITED STATES PATENT OFFICE.

WILLIAM HODGSON, OF NEW YORK, N. Y.

REGULATOR.

1,284,895.   Specification of Letters Patent.   Patented Nov. 12, 1918.

Application filed March 26, 1917. Serial No. 157,576.

*To all whom it may concern:*

Be it known that I, WILLIAM HODGSON, citizen of the United States of America, residing at New York city, county of Bronx, State of New York, have invented certain new and useful Improvements in Regulators, of which the following is a specification.

My improvements relate to diaphragmatic regulators for the automatic control of steam, hot water and vapor heating apparatus, etc., in a manner well known in the state of the art. The invention consists in the specific construction and arrangement of parts described and claimed herein, distinctive features being the formation of the diaphragm with a spiral corrugation the adjoining convolutions of which overlap each other, whereby great strength combined with a maximum of flexibility and resiliency is attained; in providing the expansion chamber with an extension in the form of a flexible coil of pipe the convolutions of which may be compacted for storage and shipment or drawn out for projection into a boiler or other heating medium to render the regulator more sensitive to variations in temperature; and in the novel form of seal joint between base, diaphragm, and cover whereby the circumferential edge of the diaphragm is positively and effectually secured to, by, and between the overlapping edges of the base and cover, all as hereinafter more fully set forth.

In the accompanying drawings.

Figure 1:
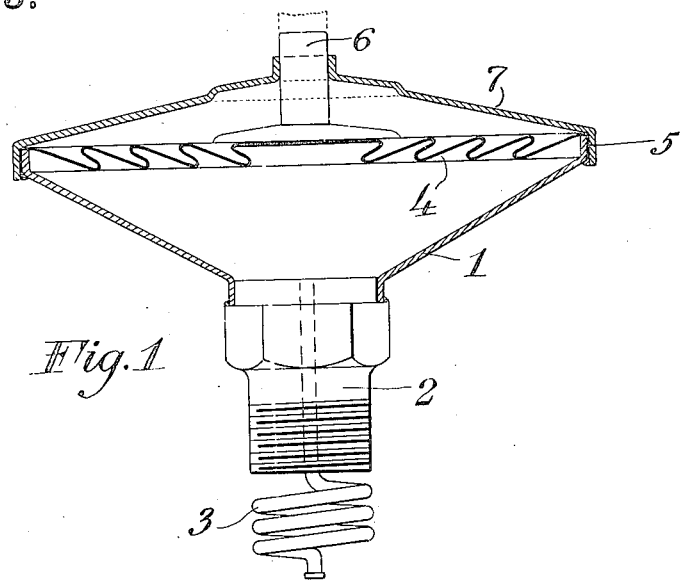
Figure 1, is a sectional elevation of a regulator embodying the essential features of my invention, and showing the tubular extension of the expansion chamber contracted.

The base 1, of the regulator is formed with a cylindrically flanged rim; and it is provided with a threaded nipple 2, for connection with a boiler or analogous heating medium. Attached to the nipple 2, is the inner or shank end of a coil of suitable metallic tubing 3, sealed at its outer extremity and communicating at its inner end with the expansion chamber formed between said base 1, and the diaphragm 4, said expansion chamber and the coil 3, being filled with a volatile fluid temperature-vehicle which controls the diaphragm 4.

Figure 2:
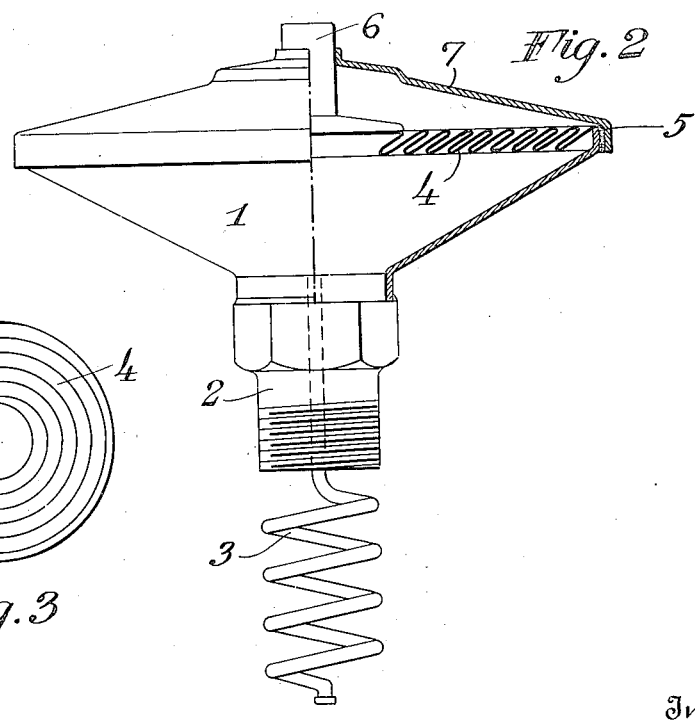
Fig. 2, is a similar view showing a modification in the form of diaphragm, and also the tubular extension of the expansion chamber drawn out for projection into a heating medium.
Figure 3:
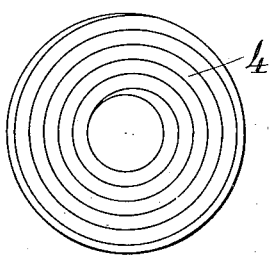
Fig. 3, is a diagrammatic top view of the diaphragm shown in Fig. 1.

When desired for use the coil 3 may be expanded or drawn out as indicated in Fig. 2, so as to project sufficiently into a boiler or the like to render the expansion chamber as a whole, or rather the volatile fluid sealed therein, extremely sensitive to changes in temperature.

The volatile fluid vehicle for actuating the diaphragm 4, being extremely penetrative, the seal between the peripheral flange of the base 1, and the circumscribing flange 5, of the diaphragm must be hermetically perfect as well as strong to withstand the strain to which it is subjected by the deflections of the diaphragm under variations of pressure. For both of these reasons I not only solder the cylindrical flange 5, of the diaphragm directly to the edge and peripheral flange of the base, but I also solder it to the cylindrical flange of the cover 7, it being understood that all three flanges fit snugly together and that the solder is "sweated" or drawn in by capillary attraction between the opposed and contacting surfaces so that the resultant jointure forms practically an integral structure in which the cylindrical flange 5, of the diaphragm is securely embedded. Furthermore this soldering together of base, diaphragm, and cover is effected in one operation, is simple and cheap, and can be accomplished by unskilled labor, thereby reducing the cost of manufacture.

The diaphragm 4, is preferably formed centrally with a flat portion to constitute a rest or bearing for the flat foot of the plunger 6, the stem of which projects through the cover 7, to transmit the motion of the diaphragm to draft controlling mechanism or analogous regulating apparatus as the case may be.

Beyond this central area or rest for the plunger 6, I form my diaphragm with a spiral corrugation of special structure in that the depth of the corrugation exceeds its width, the sides being parallel, or essentially so, and being inclined outward from the inner or expansion chamber side of the diaphragm toward the circumference thereof as shown in both Figs. 1 and 2,—the only difference between the two figures being that the spiral corrugation shown in Fig. 2, has a greater number of convolutions between the plunger rest and the peripheral flange 5, than that shown in Fig. 1. In other words, considering the regulator positioned as shown in Figs. 1 and 2, the side walls of the convolutions of the spiral corrugation are inclined upward and outward circumferentially, and this is an important and distinctive feature of my structure of diaphragm with a deep spiral corrugation having parallel inclined side walls, since if the side walls thereof were inclined in the opposite direction, i. e., inclined upward toward the center instead of upward toward the circumference, the manufacture of the diaphragm would not be practicable in a commercial sense, for the reason the spiral corrugation in the diaphragm has to be spun on a spirally grooved conoidal mandrel from which the diaphragm blank is then unscrewed and finally flattened out under pressure applied centrally, thus contracting the convolutions of the spiral corrugation and producing the result shown in the drawings. Obviously if the sides of the spiral convolutions were inclined in the opposite direction the blank could not be unscrewed from the mandrel even if it were possible to form a mandrel with an inturned spiral groove, which would seem to be at least problematic.

It is to be noted that the deep side walls of adjacent convolutions of the spiral corrugation overlap each other more or less. I am thus enabled to attain a maximum of elasticity, resilience, and strength with a minimum thickness of metal, and to effectually counteract all danger of the buckling of the plate under excessive pressure in either direction. Hence the diaphragm is not only more sensitive but also more effective, reliable and durable; and its being incorporated peripherally and integrally with the casing as hereinbefore described tends also to preserve its shape and utility.

Taken as a whole my structure of regulator herein shown and described is especially effective for use where slight variations in temperature are to be detected and rendered immediately operative since the sensitiveness of the diaphragm 4, with the deep spiral corrugation is supplemented by the equally sensitive extension 3, of the expansion chamber.

What I claim as my invention and desire to secure by Letters Patent is,

1. In a regulator of the character designated, the combination of a sealed expansion chamber containing a volatile fluid vehicle and an extension of said expansion chamber consisting of a coiled flexible pipe sealed at its outer extremity and communicating with said expansion chamber at the other, for the purpose described.

2. In a regulator of the character designated, the combination of a sealed expansion chamber containing a volatile fluid vehicle and formed with a nipple for attachment to a boiler or other heating medium, and an extension of said expansion chamber consisting of a coil of flexible pipe the stem of which is mounted in said nipple and opens into the expansion chamber and the outer extremity of which coil is sealed, for the purpose described.

In testimony whereof, I have signed my name to this specification this March 9th, 1917.

WILLIAM HODGSON.